United States Patent
Shimada

(10) Patent No.: US 9,811,310 B2
(45) Date of Patent: Nov. 7, 2017

(54) AUDIO APPARATUS

(71) Applicant: TEAC CORPORATION, Tokyo (JP)

(72) Inventor: Hirotoshi Shimada, Tokyo (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 15/222,621

(22) Filed: Jul. 28, 2016

(65) Prior Publication Data

US 2017/0031651 A1    Feb. 2, 2017

(30) Foreign Application Priority Data

Jul. 31, 2015  (JP) ................................ 2015-151747

(51) Int. Cl.
  *H03G 3/00* (2006.01)
  *G06F 3/16* (2006.01)
  *H04R 3/00* (2006.01)

(52) U.S. Cl.
  CPC .............. *G06F 3/165* (2013.01); *G06F 3/162* (2013.01); *H04R 3/005* (2013.01); *H04R 2430/01* (2013.01)

(58) Field of Classification Search
  CPC ....................................................... H03G 3/00
  See application file for complete search history.

(56) References Cited

U.S. PATENT DOCUMENTS

| | | | |
|---|---|---|---|
| 5,138,665 A * | 8/1992 | Ito | H03G 9/02 381/101 |
| 5,241,605 A | 8/1993 | Mori et al. | |
| 9,112,466 B1 * | 8/2015 | Koh | H03G 3/02 |
| 9,692,384 B2 * | 6/2017 | Wowro | H03G 7/002 |
| 2008/0232613 A1 * | 9/2008 | Salgueiro | G08B 27/00 340/506 |
| 2016/0142029 A1 * | 5/2016 | Putta | H04R 3/00 381/107 |

FOREIGN PATENT DOCUMENTS

| | | |
|---|---|---|
| JP | 3112913 B2 | 11/2000 |
| JP | 2002142286 A | 5/2002 |

* cited by examiner

*Primary Examiner* — Olisa Anwah
(74) *Attorney, Agent, or Firm* — Seed Intellectual Property Law Group LLP

(57) ABSTRACT

An audio apparatus includes a controller configured to set one of operation units as a master and another as a slave, and to cooperatively operate the slave operation unit while maintaining the level difference with the master operation unit. When an operation value of one of the operation units reaches the maximum or the minimum, the controller stores a level difference at that point in a memory, temporarily cancels the cooperative operation between the operation unit and the master operation unit, and allows for operation of the master operation unit and an operation unit that has not reached the maximum or the minimum. When the master operation unit is operated in a reverse direction and the level difference between the master operation unit and the operation unit matches the level difference stored in the memory, the controller restores the cooperative operation between the operation unit and the master operation unit.

14 Claims, 3 Drawing Sheets

AUDIO APPARATUS

CROSS REFERENCE TO RELATED APPLICATION

The entire disclosure of Japanese Patent Application No. 2015-151747 filed on Jul. 31, 2015 including specification, claims, drawings and abstract is incorporated herein by reference in its entirety.

TECHNICAL FIELD

The present disclosure relates to an audio apparatus, and in particular to an audio apparatus including operation units that cooperatively operate with each other.

BACKGROUND

In the related art, in an audio apparatus such as a sound recording apparatus, a function to cooperate on a plurality of volume controls is known.

Methods of cooperation include a gang function (GANG) in which a level difference between a plurality of volume controls is maintained and an operation is applied, and a link function (LINK) in which a plurality of volume control values are combined and an operation is applied. Among these methods, in the gang function, as a control method when one of the plurality of volume controls reaches a maximum or a minimum, two types are known, one to prohibit a further operation in order to maintain the level difference, and the other to discard the level difference and to allow a continued movement.

JP 3112913 B discloses an apparatus having a sound quality adjustment means for audio outputs of each of front and rear channels, wherein, in a predetermined mode, while a level difference between a front sound quality adjustment setting level and a rear sound quality adjustment setting level is maintained in response to a single operation, the sound quality adjustment setting levels are changed in cooperation with each other. This document further discloses that, when a setting level of one of the channels has reached an upper limit or a lower limit, the level is not changed in a state where the levels are maintained, or the cooperation is cancelled by another key operation to allow change of the level of the other channel.

JP 2002-142286 A discloses that adjacent channels are paired, and, when the mode is set to a gang mode, cooperative control is applied in a state where a relationship of parameter values which are set in the channels is maintained, and, when the mode is set to a link mode, a cooperative control is applied while setting the parameter values of the channels to same values. The document further discloses that, when a parameter value of one of the channels has reached a maximum or a minimum, the relationship between the parameter values is maintained.

In the gang function, in the control method to prohibit further operations in order to maintain the level difference when one of the plurality of volumes has reached the maximum or the minimum, for example, even when the input audio signal level becomes excessive and it is desired to completely reduce the volume as an emergency operation, there is a problem in that not all of the volumes can be completed reduced.

SUMMARY

An advantage of the present disclosure lies in the provision of an apparatus in which an operation may be applied while maintaining a level difference between a plurality of operation units, and, in an emergency, the operation values of all operation units can be easily operated to the maximum or the minimum.

According to one aspect of the present disclosure, there is provided an audio apparatus comprising: a plurality of operation units; and a controller configured to set one of the plurality of operation units as a master and another as a slave, and to cooperatively operate, in response to an operation of the master operation unit, the slave operation unit while maintaining a level difference with the master operation unit. The controller is configured such that, when an operation value of at least one of the plurality of operation units has reached a maximum or a minimum, the controller stores a level difference at that point of time in a memory, temporarily cancels cooperation between the operation unit that has reached the maximum or the minimum and the master operation unit, and allows operation of the master operation unit and an operation unit that has not reached the maximum or the minimum, and, when the master operation unit is operated in a reverse direction and a level difference between the master operation unit and the operation unit that has reached the maximum or the minimum matches the level difference stored in the memory, the controller recovers the cooperation between the operation unit that has reached the maximum or the minimum and the master operation unit.

According to another aspect of the present disclosure, there is provided an audio apparatus comprising: a plurality of operation units; and a controller configured to set one of the plurality of operation units as a master and another as a slave, and to cooperatively operate, in response to an operation of the master operation unit, the slave operation unit while maintaining a level difference with the master operation unit. The controller is configured so that, when an operation value of at least one of the plurality of operation units has reached a maximum or a minimum, the controller stores an operation value of the master operation unit at that point of time in a memory, temporarily cancels cooperation between the operation unit that has reached the maximum or the minimum and the master operation unit, and allows an operation of the master operation unit and an operation unit that has not reached the maximum or the minimum, and, when the master operation unit is operated in a reverse direction and the operation value of the master operation unit matches the operation value stored in the memory, the controller recovers the cooperation between the operation unit that has reached the maximum or the minimum and the master operation unit.

According to another aspect of the present disclosure, the operation unit may be a volume control which can be rotationally operated.

According to various aspects of the present disclosure, a plurality of operation units can be cooperatively operated while maintaining a level difference, and in an emergency or the like, operation values of all operation units can be easily operated to the maximum or the minimum. In addition, according to various aspects of the present disclosure, recovery to the cooperative operation can also be easily achieved.

BRIEF DESCRIPTION OF DRAWINGS

Embodiment(s) of the present disclosure will be described based on the following figures, wherein.

DESCRIPTION OF EMBODIMENTS

An embodiment of the present disclosure will now be described with reference to the drawings, and exemplifying a sound recording apparatus as an example of the audio apparatus. The following description of the embodiment, however, is merely exemplary, and the present disclosure is not limited to the following embodiment.

Figure 1:
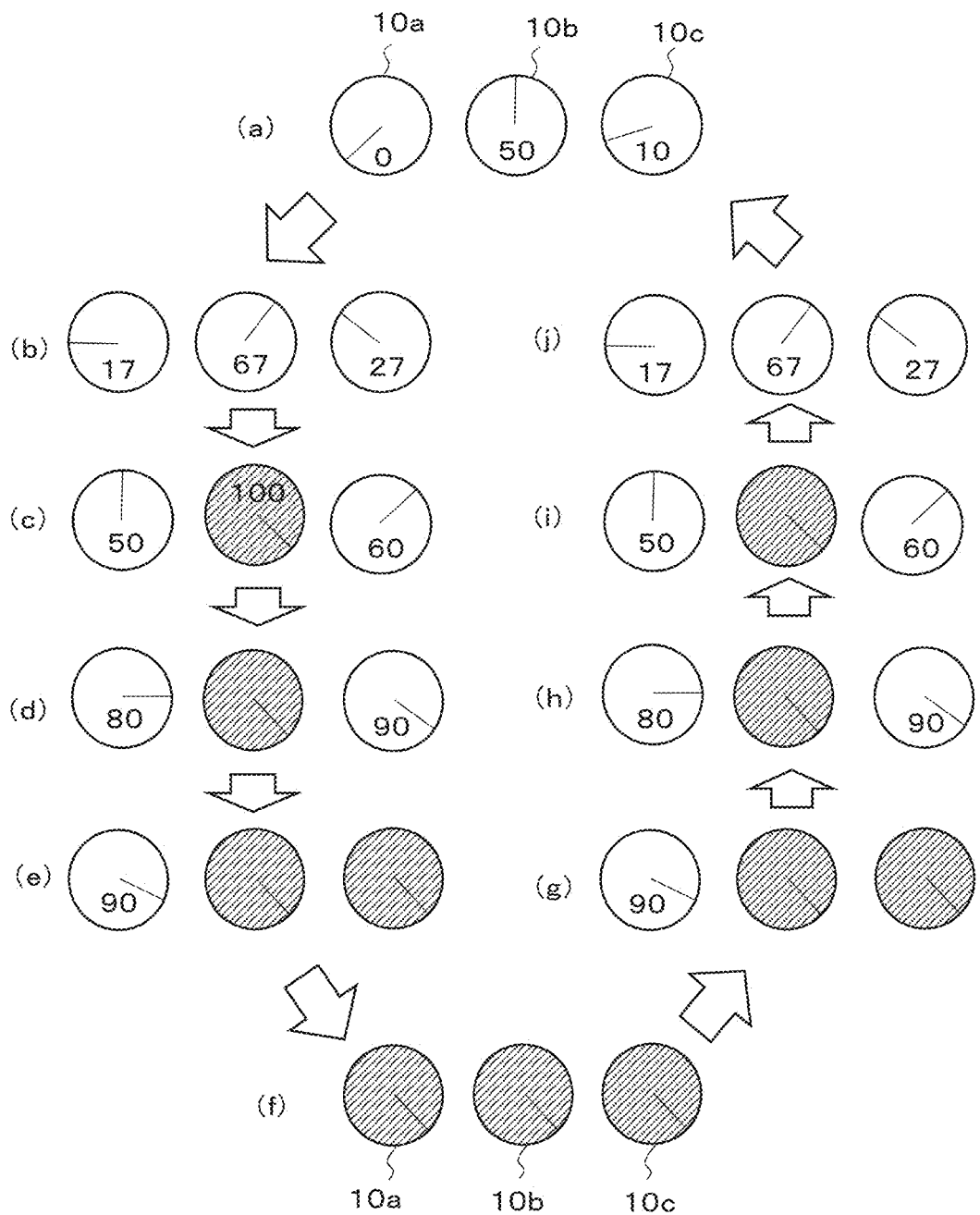
FIG. 1 is an explanatory diagram of a volume operation according to an embodiment of the present disclosure.

FIG. 1 is a diagram showing a function in which a plurality of volume controls (in FIG. 1, three volume controls; 10a, 10b, and 10c) of a sound recording apparatus of the present embodiment are operated in a cooperative manner while a level difference is maintained (gang function).

FIG. 1(a) shows an initial state, with a level of the volume control 10a being 0, a level of the volume control 10b being 50, and a level of the volume control 10c being 10. A user operates, when cooperatively operating the three volume controls 10a, 10b, and 10c, an operation unit to output an operation signal indicating the cooperative operation to a controller; that is, a CPU, of the sound recording apparatus. The CPU acquires operation values of the volume controls 10a, 10b, and 10c, calculates the levels thereof, and stores the calculated levels in a memory. In the state of FIG. 1(a), as the state is:

Volume control 10a: 0,
Volume control 10b: 50, and
Volume control 10c: 10, the CPU stores a level difference between the volume controls 10a and 10b as (50−0)=+50, and a level difference between the volume controls 10b and 10c as (10−50)=−40. The forms of level differences are not limited to these forms, and alternatively, one of the volume controls may be set as a master volume control, and a level difference from the master may be calculated and stored. For example, when the volume control 10a is set as the master, a level difference between the volume controls 10a and 10b is stored as (50−0)=+50, and a level difference between the volume controls 10a and 10c is stored as (10−0)=+10.

FIG. 1(b) shows a transitioned state from FIG. 1(a), in which the user operates the volume control 10a to set:

Volume control 10a: 0→17.

When the volume control 10a is set as the master and the volume controls 10b and 10c are set as slaves, with an operation value of the volume control 10a as a reference, the volume controls are cooperatively operated while maintaining the level differences.

Therefore, in cooperation with the above-described operation of the volume control 10a, the state changes as follows:

Volume control 10b: 50→67, and
Volume control 10c: 10→27.

FIG. 1(c) shows a transitioned state from FIG. 1(b), in which the user operates the volume control 10a to set:

Volume control 10a: 17→50.

In cooperation with this, the volume controls 10b and 10c change as:

Volume control 10b: 67→100, and
Volume control 10c: 27→60.

When the minimum (lower limit value) of the volume controls 10a, 10b, and 10c is 0 and the maximum (upper limit value) is 100, the volume control 10b reaches the maximum with this operation. In FIG. 1(c), the reaching of the maximum by the volume control 10b is shown with hatching. In the gang function of the related art, when any of the plurality of volume controls reaches the maximum, further operations are prohibited in order to maintain the level difference. Thus, even if the user attempts to operate the volume control 10a to the right (an operation in a direction to increase the operation value) from the state of FIG. 1(c), the operation is prohibited. In the contrary, in the present embodiment, even when the volume control 10b has reached the maximum, a further volume operation is allowed.

FIG. 1(d) shows a transitioned state from FIG. 1(c), in which the user operates the volume control 10a to set:

Volume control 10a: 50→80.

In response to this operation, the CPU stores, in a memory, the level difference between the volume controls 10a and 10b at a point of time when the volume control 10b has reached the maximum, temporarily cancels the cooperation relationship between the volume controls 10a and 10b, and cooperatively operates only the volume control 10c. In other words, the volume controls change as:

Volume control 10b: 100 (maintained), and
Volume control 10c: 60→90.

The "temporary cancel" of the cooperation relationship is in consideration that, as will be described later, the cooperation relationship will again be recovered by an operation of the volume control 10a in a reverse direction, and means a cancelling operation with a condition for possible recovery.

FIG. 1(e) shows a transitioned state from FIG. 1(d), in which the user operates the volume control 10a to set:

Volume control 10a: 80→90.

With this operation, the volume controls change as follows:

Volume control 10b: 100 (maintained), and
Volume control 10c: 90→100.

With this operation, in addition to the volume control 10b, the volume control 10c reaches the maximum. In FIG. 1(e), the reaching of the maximum by the volume control 10c is shown with hatching. In response to this operation, the CPU stores, in the memory, the level difference between the volume controls 10a and 10c at the point of time when the volume control 10c has reached the maximum, and temporarily cancels the cooperation relationship between the volume controls 10a and 10c.

FIG. 1(f) shows a transitioned state from FIG. 1(e), in which the user operates the volume control 10a to set:

Volume control 10a: 90→100.

In this state:

Volume control 10b: 100 (maintained), and
Volume control 10c: 100 (maintained).

It should be noted that, in the present embodiment, in FIGS. 1(c)-1(f), although at least one of the volume controls has reached the maximum, the user can still operate the volume control 10a to change (increase) the operation value thereof. This means that, by continuously operating the volume control 10a serving as the master, it is possible to quickly set the operation values of all volume controls 10a, 10b, and 10c to the maximum.

FIG. 1(g) shows a transitioned state from FIG. 1(f), in which the user operates the volume control 10a in a reverse direction (direction to reduce the operation value) to set:

Volume control 10a: 100→90.

In this case:

Volume control 10b: 100 (maintained), and
Volume control 10c: 100 (maintained).

With this operation, the level difference between the volume controls 10*a* and 10*c* is changed from 0 to +10, and the state returns to the state of the same level difference as in the state of FIG. 1(*e*); that is, a state where the cooperation relationship between the volume controls 10*a* and 10*c* is temporarily cancelled. When the CPU detects this state, the CPU recovers the cooperation relationship between the volume controls 10*a* and 10*c*.

FIG. 1(*h*) shows a transitioned state from FIG. 1(*g*), in which the user operates the volume control 10*a* in the reverse direction to set:

Volume control 10*a*: 90→80.

In this case,

Volume control 10*b*: 100 (maintained), and

Volume control 10*c*: 100→90.

The volume control 10*c* is cooperatively operated with the volume control 10*a*, and the level difference is maintained at +10.

FIG. 1(*i*) shows a transitioned state from FIG. 1(*h*), in which the user operates the volume control 10*a* in the reverse direction to set:

Volume control 10*a*: 80→50.

In this case,

Volume control 10*b*: 100 (maintained), and

Volume control 10*c*: 90→60.

With this operation, the level difference between the volume controls 10*a* and 10*b* becomes +50, and the state returns to the state with a same level differences as in the state of FIG. 1(*c*); that is, the state where the cooperation relationship between the volume controls 10*a* and 10*b* is temporarily cancelled. When the CPU detects this state, the CPU recovers the cooperation relationship between the volume controls 10*a* and 10*b*.

FIG. 1(*j*) shows a transitioned state from FIG. 1(*i*), in which the user operates the volume control 10*a* in the reverse direction to set:

Volume control 10*a*: 50→17.

In this case,

Volume control 10*b*: 100→67, and

Volume control 10*c*: 60→27.

The volume controls 10*b* and 10*c* are cooperatively operated with the volume control 10*a*, and the level differences thereof are maintained at +50 and +10, respectively.

When the user further operates the volume control 10*a* in the reverse direction from FIG. 1(*j*) so that the state transitions to the state of FIG. 1(*a*), Volume control 10*a*: 17→0, Volume control 10*b*: 67→50, and Volume control 10*c*: 27→10.

Thus, the state returns to the initial state. This means that all volume controls 10*a*, 10*b*, and 10*c* can be quickly returned to the initial state by only operating the volume control 10*a* serving as a master.

In the initial state of FIG. 1(*a*), when the volume control 10*b* is set as a master, the volume controls 10*a* and 10*c* are set as slaves, and the volume control 10*b* is operated in a counter-clockwise direction, because the volume control 10*a* is already at the minimum of 0, the volume control 10*a* is not subject to cooperation with this operation. Although the volume control 10*c* cooperates with the volume control 10*b* until the minimum of 0 is reached, after reaching the minimum of 0, the volume control 10*c* is not subject to cooperation, and it is clear that all volume controls 10*a*, 10*b*, and 10*c* can be set at the minimum by only operating the volume control 10*b*. It is also clear that, when the volume control 10*b* is operated in the clockwise direction from this state, the cooperation with the volume control 10*c* is recovered at the point of time when the operation value of the volume control 10*b* reaches 40, and the cooperation with the volume control 10*a* is recovered at the point of time when the operation value of the volume control 10*b* reaches 50.

In this manner, when a gang function is set and when any of the three volume controls 10*a*, 10*b*, and 10*c* which cooperate while maintaining level differences reaches the maximum or the minimum, the level difference at that point of time is stored in a memory, the cooperation state is temporarily cancelled, and the operation of the volume control which has not reached the maximum or the minimum is allowed while maintaining the cooperation state for the volume control which has not reached the maximum or the minimum. With such a configuration, even when the gang function is set, an emergency operation by the user is enabled.

In addition, in the present embodiment, when the user operates the volume control in the reverse direction, the cooperation state is again automatically recovered when the level difference between the volume controls becomes equal to the level difference when the cooperation state is temporarily cancelled. With such a configuration, it becomes not necessary for the user to again set the gang function, and the operability by the user can be improved.

In the present embodiment, the CPU may store in the memory the operation value of the master volume control when the cooperation state of the volume controls is temporarily cancelled, in place of the level difference when the cooperation state of the volume controls is temporarily cancelled. Specifically, the operation value (50) of the volume control 10*a* at the state of FIG. 1(*c*) is stored in the memory as the operation value when the cooperation relationship with the volume control 10*b* is temporarily cancelled, and the operation value (90) of the volume control 10*a* in the state of FIG. 1(*e*) is stored in the memory as the operation value when the cooperation relationship with the volume control 10*c* is temporarily cancelled. When the user operates the volume control 10*a* in the reverse direction, and the operation value again becomes 90, the CPU detects this event and recovers the cooperation relationship with the volume control 10*c*. Similarly, when the operation value of the volume control 10*a* again becomes 50, the CPU detects this event and recovers the cooperation relationship with the volume control 10*b*.

Figure 2:
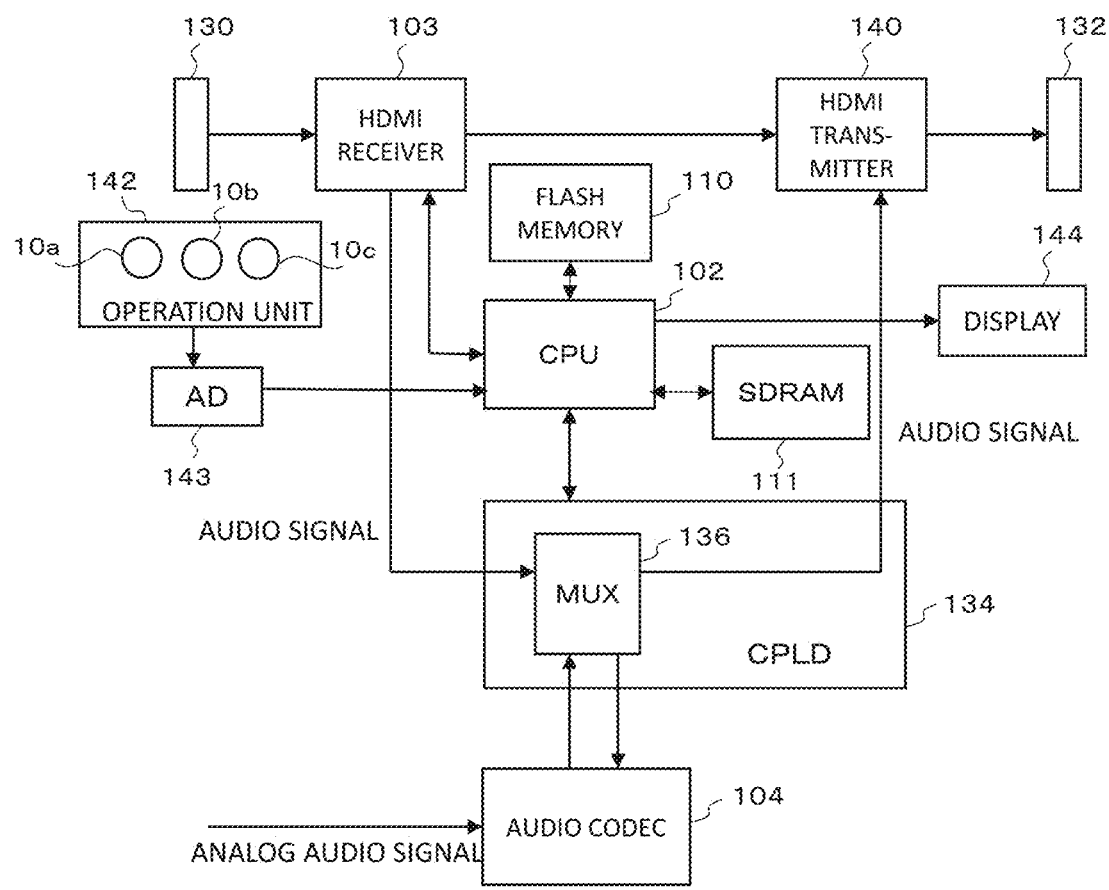
FIG. 2 is a structural block diagram of a sound recording apparatus according to an embodiment of the present disclosure.

FIG. 2 is a structural block diagram of a sound recording apparatus according to the present embodiment. The sound recording apparatus includes an HDMI (registered trademark) input terminal (HDMI IN) 130, an HDMI output terminal (HDMI OUT) 132, an HDMI receiver 103, an HDMI transmitter 140, a CPU 102, a CPLD (complex programmable logic device) 134, an audio CODEC 104, a multiplexer (MUX) 136, an operation unit 142, and an AD 143. In the present embodiment, the CPU 102 functions as the controller.

The HDMI input terminal 130 is connected to other devices via an HDMI cable.

The HDMI receiver 103 outputs an LRCK signal, a BCLK (or SCLK) signal, a data signal, and an MCLK signal from a TMDS signal and a TMDS clock signal transmitted from the other device via the HDMI cable. The CPU 102 is connected to the HDMI receiver 103 by an I2C bus, and controls the operation of the HDMI receiver 103. The HDMI receiver 103 supplies an audio signal included in the data signal to the CPLD 134.

The CPLD 134 outputs the audio signal to the multiplexer (MUX) 136. Meanwhile, an analog audio signal which is input from a microphone or the like is converted into a digital signal by the audio CODEC 104 and is supplied to the CPLD 134. The CPLD is one type of a programmable logic device, and is configured by a nonvolatile memory on a chip. In the following, for the purpose of the convenience of explanation, the audio signal included in the HDMI signal is referred to as an HDMI audio signal and the audio signal from the microphone or the like is referred to as an input audio signal, for distinction purpose.

The operation unit 142 is formed from a button, a selector, or a touch switch or the like which can be operated by the user, and in particular includes a plurality of volume controls 10a, 10b, and 10c such as trim volume controls. The user operates the operation unit 142 to execute operations such as level adjustment of the input audio signal. An operation signal from the operation unit 142 is supplied to the CPU 102. Operation values of the volume controls 10a, 10b, and 10c of the operation unit 142 are converted by the AD 143 into digital values and supplied to the CPU 102.

The CPU 102 uses a flash memory 110 and an SDRAM 111 as a program memory and a working memory, respectively, reads a processing program stored in the program memory, and executes predetermined processes. Specifically, the CPU 102 stores audio data, for example, in an SD card memory equipped on an SD card connecter (not shown). In addition, the CPU 102 controls the multiplexer 136 of the CPLD 134 in response to an operation signal from the operation unit 142, to embed the input audio signal in the HDMI audio signal. Alternatively, the CPU 102 selects an audio signal of a CH to be monitored from the HDMI audio signal and the input audio signal in response to the operation signal from the operation unit 142, and outputs the selected signal to the audio CODEC 104, and selects the HDMI audio signal to be supplied to a downstream device and outputs the selected signal to the HDMI transmitter 140.

The CPU 102 also determines whether or not to cooperate on the volume controls 10a, 10b, and 10c while maintaining the respective level differences (gang function) in response to the operation signal from the operation unit 142, and, when the gang function is to be executed, the CPU 102 calculates the level differences among the volume controls 10a, 10b, and 10c based on the digital values from the AD 143, and cooperates on the volume controls 10a, 10b, and 10c to maintain the level differences.

The HDMI transmitter 140 outputs the TMDS signal including the HDMI audio signal and the TMDS clock signal to the other devices via the HDMI output terminal 132.

The audio CODEC 104 executes various processing including A/D conversion and encoding on the analog audio signal which is input, and stores and records the sound in the SD card memory via the CPU 102. In addition, the audio CODEC 104 reads the sound data stored in the SD card memory via the CPU 102, decodes and D/A converts the data, and outputs as an analog sound signal. Moreover, the audio CODEC 104 converts the audio signal for monitor supplied from the multiplexer 136 into an analog signal, and outputs the same to the outside as a monitor output.

A display 144 is formed from a liquid crystal panel or an organic EL panel, and displays the state operated by the operation unit 142, and CH assign state of the HDMI audio signal or the like in response to an instruction from the CPU 102.

Figure 3:
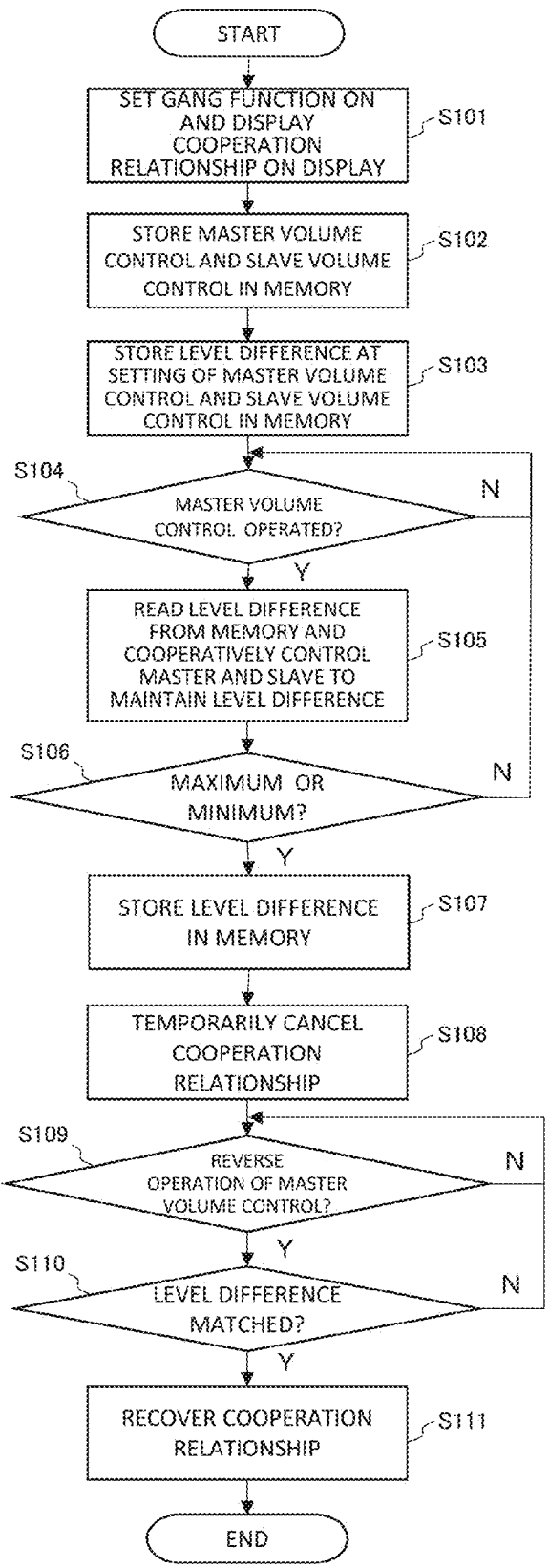
FIG. 3 is a process flowchart of an embodiment of the present disclosure.

FIG. 3 is a process flowchart of the CPU 102 in the present embodiment. A case is shown in which the user operates the operation unit 142 to set the gang function ON with the volume control 10a as a master. In this process, the CPU 102 displays, on the display 144, that the gang function is set ON, and the volume controls which are in the cooperation relationship (volume controls 10a, 10b, and 10c) (S101). The CPU 102 also stores the volume control 10a which is set as the master and the volume controls 10b and 10c which are set as slaves in the SDRAM 111 (S102), and calculates the level difference at the time of setting; that is, the level differences of the volume controls 10b and 10c with respect to the volume control 10a, and stores the level differences in the SDRAM 111 (S103).

When the user operates the master volume control 10a, the CPU 102 detects this operation (YES in S104), and the operation value is converted into a digital value by the AD 143 and supplied to the CPU 102. The CPU 102 reads the level differences stored in the SDRAM 111, and cooperates the volume controls 10b and 10c to maintain the level differences (S105).

During the execution of the gang function, the CPU 102 determines, as an interrupt process, whether or not any of the volume controls 10a, 10b, and 10c has reached a maximum (upper limit) or a minimum (lower limit) (S106). When the maximum or the minimum is not reached, the gang function is continued to be executed (NO in S106). On the other hand, when any of the volume controls 10a, 10b, and 10c has reached the maximum or the minimum (YES in S106), the CPU 102 stores, in the SDRAM 111, the level difference at that point of time or the operation value of the volume control 10a serving as the master at that point (S107), temporarily cancels the cooperation relationship with the volume control which has reached the maximum or the minimum (S108), and executes a process according to the operation of the volume control 10a; for example, the level adjustment of the input audio signal, while maintaining the operation value of the volume control which has reached the maximum or the minimum.

In addition, the CPU 102 detects the operation when the volume control 10a serving as the master is operated in the reverse direction in a state where the cooperation relationship is temporarily cancelled (YES in S109), and, when the operation value of the volume control 10a matches the level difference or the operation value stored in the SDRAM 111 (YES in S110), the CPU 102 recovers the cooperation relationship and changes, according to the operation of the volume control 10a, the other, slave volume controls 10b and 10c (S111). Even when the master volume control 10a is operated in the reverse direction, if the operation value does not match the level difference (NO in S110), the cooperation relationship is not recovered.

In the present embodiment, when any of the volume controls 10a, 10b, and 10c has reached the maximum or the minimum, the CPU 102 automatically temporarily cancels the cooperation relationship with the volume control reaching the maximum or the minimum (while maintaining the cooperation relationship with the other volume controls not reaching the maximum or the minimum). Thus, the user does not need to manually cancel the gang function every single time. Moreover, in the present embodiment, the temporarily cancelled cooperation relationship is automatically recovered when the temporarily released state is replicated. Therefore, it is not necessary to separately operate the operation button or the like in order to recover the gang function.

The present embodiment is particularly effective when it is desired to mute the sound in an emergency manner during execution of the gang function, and the muting can be quickly achieved while not requiring manual cancelling of the gang function. In addition, after such a mute operation, the gang function can be very easily recovered and the level difference can be maintained.

In the present embodiment, when any of the volume controls 10a, 10b, and 10c has reached the maximum or the minimum and the cooperation relationship thereof is temporarily cancelled, the CPU 102 stores the level difference or the operation value of the volume control 10a serving as the master at that point of time in the SDRAM 111 which is a volatile memory. Alternatively, the CPU may store the information in a flash memory 110 which is a nonvolatile memory in place of or in addition to the SDRAM 111, to prepare for recovery of the cooperation relationship after the power is switched OFF.

In addition, in the present embodiment, when any of the volume controls 10a, 10b, and 10c has reached the maximum or the minimum and the cooperation relationship is temporarily cancelled, the temporary cancelling may be displayed on the display 144. In correspondence to FIG. 1, when the state transitions to the state of FIG. 1(c), it is displayed on the display 144 that the cooperation relationship of the volume control 10b is cancelled, and when the state transitions to the state of FIG. 1(e), it is displayed on the display 144 that the cooperation relationship with the volume control 10c is cancelled. Similarly, the recovery may be displayed on the display 144. In the present embodiment, the gang function is automatically temporarily cancelled and recovered by only the operation of the volume 10a, it may be desirable to notify the user of the state on the display 144 or the like.

In the present embodiment, the volume control of the sound recording apparatus is exemplified. The present disclosure, however, is not limited to such a configuration, and may be applied to any arbitrary audio apparatus having a plurality of operation units which operate in cooperation while maintaining the level difference, such as, for example, a powered speaker having a plurality of volume controls, or the like.

The invention claimed is:

1. An audio apparatus, comprising:
a plurality of operation units; and
a controller configured to set one of the plurality of operation units as a master and another as a slave, and to cooperatively operate, in response to an operation of the master operation unit, the slave operation unit while maintaining a level difference with the master operation unit, wherein
when an operation value of at least one of the plurality of operation units has reached a maximum or a minimum, the controller stores a level difference at that point of time in a memory, temporarily cancels a cooperation between the operation unit that has reached the maximum or the minimum and the master operation unit, and allows an operation of the master operation unit and an operation unit that has not reached the maximum or the minimum, and, when the master operation unit is operated in a reverse direction and a level difference between the master operation unit and the operation unit that has reached the maximum or the minimum matches the level difference stored in the memory, the controller recovers the cooperation between the operation unit that has reached the maximum or the minimum and the master operation unit.

2. The audio apparatus according to claim 1, wherein the operation unit is a volume control that can be rotationally operated.

3. The audio apparatus according to claim 1, wherein the controller includes a processor.

4. The audio apparatus according to claim 1, wherein the memory is a volatile memory.

5. The audio apparatus according to claim 1, wherein the memory is a nonvolatile memory.

6. The audio apparatus according to claim 1, further comprising:
a display that displays, when the cooperation between the operation unit that has reached the maximum or the minimum and the master operation unit is temporarily cancelled, the cancelled state.

7. The audio apparatus according to claim 1, further comprising:
a display that displays, when the cooperation between the operation unit that has reached the maximum or the minimum and the master operation unit is recovered, the recovered state.

8. An audio apparatus, comprising:
a plurality of operation units; and
a controller configured to set one of the plurality of operation units as a master and another as a slave, and to cooperatively operate, in response to an operation of the master operation unit, the slave operation unit while maintaining a level difference with the master operation unit, wherein
when an operation value of at least one of the plurality of operation units has reached a maximum or a minimum, the controller stores an operation value of the master operation unit at that point of time in a memory, temporarily cancels cooperation between the operation unit that has reached the maximum or the minimum and the master operation unit, and allows an operation of the master operation unit and an operation unit that has not reached the maximum or the minimum, and, when the master operation unit is operated in a reverse direction and the operation value of the master operation unit matches the operation value stored in the memory, the controller recovers the cooperation between the operation unit that has reached the maximum or the minimum and the master operation unit.

9. The audio apparatus according to claim 8, wherein the operation unit is a volume control which can be rotationally operated.

10. The audio apparatus according to claim 8, wherein the controller includes a processor.

11. The audio apparatus according to claim 8, wherein the memory is a volatile memory.

12. The audio apparatus according to claim 8, wherein the memory is a nonvolatile memory.

13. The audio apparatus according to claim 8, further comprising:
a display that displays, when the cooperation between the operation unit that has reached the maximum or the minimum and the master operation unit is temporarily cancelled, the cancelled state.

14. The audio apparatus according to claim 8, further comprising:
a display that displays, when the cooperation between the operation unit that has reached the maximum or the minimum and the master operation unit is recovered, the recovered state.

* * * * *